United States Patent [19]
Gruber

[11] Patent Number: 5,105,669
[45] Date of Patent: Apr. 21, 1992

[54] DYNAMICALLY TUNED GYRO

[76] Inventor: Josef P. Gruber, Erlenweg 7, 77772 Mühlhofen, Fed. Rep. of Germany

[21] Appl. No.: 658,092

[22] Filed: Feb. 20, 1991

[30] Foreign Application Priority Data

Feb. 20, 1990 [DE] Fed. Rep. of Germany ....... 4005274

[51] Int. Cl.$^5$ ...................... G01C 19/28; G01C 19/30
[52] U.S. Cl. .................... 74/5.46; 74/5.6 E
[58] Field of Search .............. 74/5.46, 5.6 E, 5.4, 74/5 F

[56] References Cited

U.S. PATENT DOCUMENTS

| | | | |
|---|---|---|---|
| 3,354,726 | 11/1967 | Krupick et al. | 74/5 F |
| 3,702,569 | 11/1972 | Quinn et al. | 74/5.47 |
| 4,189,948 | 2/1980 | Buckley et al. | 74/5.46 |
| 4,320,669 | 3/1982 | Grohe | 74/5.46 X |
| 4,454,777 | 6/1984 | Krupick et al. | 74/5.46 |
| 4,487,083 | 12/1984 | Quermann | 74/5.46 |
| 4,651,576 | 3/1987 | Luke | 74/5.6 E X |
| 4,891,997 | 1/1990 | Hayashi | 74/5.46 |

FOREIGN PATENT DOCUMENTS

| | | | |
|---|---|---|---|
| 0146850 | 7/1988 | European Pat. Off. | |
| 0336795 | 10/1989 | European Pat. Off. | |
| 2522827 | 2/1976 | Fed. Rep. of Germany | 74/5.46 |
| 3344315 | 11/1986 | Fed. Rep. of Germany | |
| 3519891 | 4/1987 | Fed. Rep. of Germany | |
| 3804767 | 7/1989 | Fed. Rep. of Germany | 74/5.6 E |
| 0238411 | 10/1987 | Japan | 74/5.4 |

*Primary Examiner*—Rodney H. Bonck
*Attorney, Agent, or Firm*—Lee, Mann, Smith, McWilliams & Sweeney

[57] ABSTRACT

With an electrically caged, dynamically tuned gyro, the torquers (34, 36) contain two annular discs (58, 60) which extend out radially and are attached to the gyro rotor (18). The annulalr discs (58, 60) are axially magnetized and an air gap (66) is formed therein between. The torquers (34, 36) fcurthermore contain flat coils (68, 70; 72, 74) which are radially arranged and partially extend out into the air gap (66).

9 Claims, 2 Drawing Sheets

DYNAMICALLY TUNED GYRO

TECHNICAL FIELD

The invention relates to a dynamically tuned gyro, comprising
(a) a driving motor having a gyro case which contains an arrangement of bearings for a motor shaft,
(b) a gyro rotor,
(c) a gimbal assembly formed by means of spring joints for connecting the gyro rotor with the motor shaft, in which this gimbal assembly contains a gimbal whose dynamic torques compensate for the restoring torques of the spring joints,
(d) pick-offs, which respond to deflections of the gyro rotor about a first or a second input axis, these input axes being orthogonally arranged to each other and to the axis of the motor shaft,
(e) torquers which operate about the input axes.

In such dynamically tuned gyros, the gyro rotor is so driven by the motor shaft through the gimbal assembly such that torques operate about the rotational axis only. The restoring torques of the spring joints are compensated for by means of opposite dynamic torques of the same amount exerted by the gimbal. The gyro rotor is electrically caged at a position of rest: an excursion out of this position of rest about one of the input axes produces a signal at the associated pick-off. This signal is applied via the caging circuit to a torquer, which exerts a torque on the gyro rotor about the other input axis. This torque counteracts the excursion in accordance with the laws of gyrostatics.

BACKGROUND ART

Such an electrically caged, dynamically tuned gyro having two input axes which are orthogonal to each other is described in DE-A1-30 33 281. There, the motor is arranged in a part of a case which is separated by means of a partition from a part of a case containing the gyro rotor. An arrangement of bearings for the motor shaft sits in the partition. The gyro rotor contains an annular groove in its end face facing the partition, with the sidewalls of this groove being formed by radially magnetized rings. Pairs of diametrically opposed flat coils curved along a cylinder surface extend into this annular groove. The flat coils, in conjunction with the rings, form the torquers. The pick-offs are formed by coils, which sit on the partition and cooperate with the end face of the gyro rotor. The signals of the pick-offs are applied cross-wise to the torquers via analog caging circuits. A differentiating damping network for the damping of nutational oscillations is also provided in DE-A1-30 33 281.

Similarly constructed, electrically caged, dynamically tuned gyros are illustrated and described in DE-A1-28 34 379, as well as DE-B2-24 29 913 and DE-C-12 81 216.

In the EP-A2-0 251 157, an inertial detector arrangement having an electrically caged, dynamically tuned gyro is described in which the caging circuit operates digitally.

The DE-C2-32 13 720 shows a dynamically suspended gimbal suspension having two degrees of freedom.

U.S. Pat. No. 3,702,569 describes a gyro with a rotor which is driven by a motor through a flexible joint. The peripheral portion of the rotor is made of magnetic material and forms an annular channel having an inverted U-shape cross section. A ring type permanent magnet polarized at its inner and outer peripheries is mounted on the inner peripheral wall of the channel. Torquer coil windings are embedded in an insulating cylinder that extends partially into the annular air gap formed between the outer channel wall and the ring magnet.

A similar design is shown in German patent 3,344,315.

German patent 3,519,891 discloses a gyro the rotor of which is rotatably mounted on a shaft which, in turn, is adapted for swivelling movement by means of flexible joints. The rotor is driven by a spring or fluid motor. A hat-shaped structure carrying a ring of magnetic material below its "rim" is arranged on the swivelling shaft inside the rotor and does not rotate with the rotor. The ring is arranged in front of the end face of the rotor, axial torquer coils cooperate with this ring to exert torques on the rotor.

DISCLOSURE OF THE INVENTION

It is the object of the invention to simplify the production of an electrically caged, dynamically tuned gyro of the type mentioned above.

It is additionally the object of the invention, when using a given rotor size, to either increase the spin while maintaining constant spin frequency or decrease the spin frequency while maintaining constant spin; or else, to reduce the gyro rotor in size while maintaining constant spin frequency and constant spin.

It is a further object of the invention to avoid interference between the pick-offs and the coils of the torquers.

Lastly, it is the object of the invention to improve the heat dissipation of the heat generated by the coils of the torquers. According to the invention, these objects are achieved in that
(f) the torquers comprise two annular discs which extend out radially and are attached to the gyro rotor,
(g) the annular discs are axially magnetized,
(h) an air gap exists between the annular discs, and
(i) the torquers furthermore comprise flat coils which are radially arranged and partially extend out into the air gap.

The gyro rotor can be manufactured as a simple turned part in such a construction. The coils of the torquers can also be more simply manufactured because the wound flat coils no longer need to be brought into cylindrical form.

A good homogeneity of the magnetic field is achieved by means of the axial magnetizing direction. Because the air gap between gyro rotor and disc coil can be larger dimensioned, the influence of this air gap on the gyro drift is reduced in comparison to the previously known constructions.

The gyro rotor can be solidly constructed except for a narrow peripheral groove, into which the flat coils of the torquers extend. The moment of inertia of the gyro rotor having predetermined external dimensions is thereby increased. With constant rotor size, a higher spin is thereby attainable. Alternatively, the spin frequency can be reduced when using constant rotor size and constant spin. A lower spin frequency increases the service life of the bearings. Should spin and spin frequency be retained, the gyro rotor can be smaller dimensioned.

Because the flat coils of the torquers are carried by a support which is arranged outside of the gyro rotor, good heat dissipation of the heat generated by the coils of the torquers is possible.

The flat coils of the torquers can be cast into an annular disc. In this way, the annular disc sits at a cylinder jacket surrounding the gyro rotor, which cylinder jacket is connected to a partition. The heat from the flat coils can be efficiently dissipated by means of such a cylinder jacket.

The flat coils of the torquers can be arranged in the area of one end of the gyro rotor and the pick-offs can be arranged axially spaced therefrom in the area of the other end of the gyro rotor. In this way, the danger of interference between the pick-offs and the coils of the torquers is reduced in comparison to previously known gyros. The magnetic shielding of the pick-offs is improved.

The flat coils can be arranged close to the end of the gyro rotor which end is remote from the motor. Usually, each torquer contains a pair of diametrically opposed flat coils. Thereby, each winding of the flat coils contains a curved outer section substantially extending out over a quadrant, and a secantial inner section. The outer diameter of the magnetized annular discs can lie approximately in the middle between the inner diameter and the outer diameter of the annular disc containing the flat coils.

An embodiment of the invention will be explained in greater detail hereinbelow with reference to the accompanying drawings:

PREFERRED EMBODIMENT OF THE INVENTION

Figure 1:
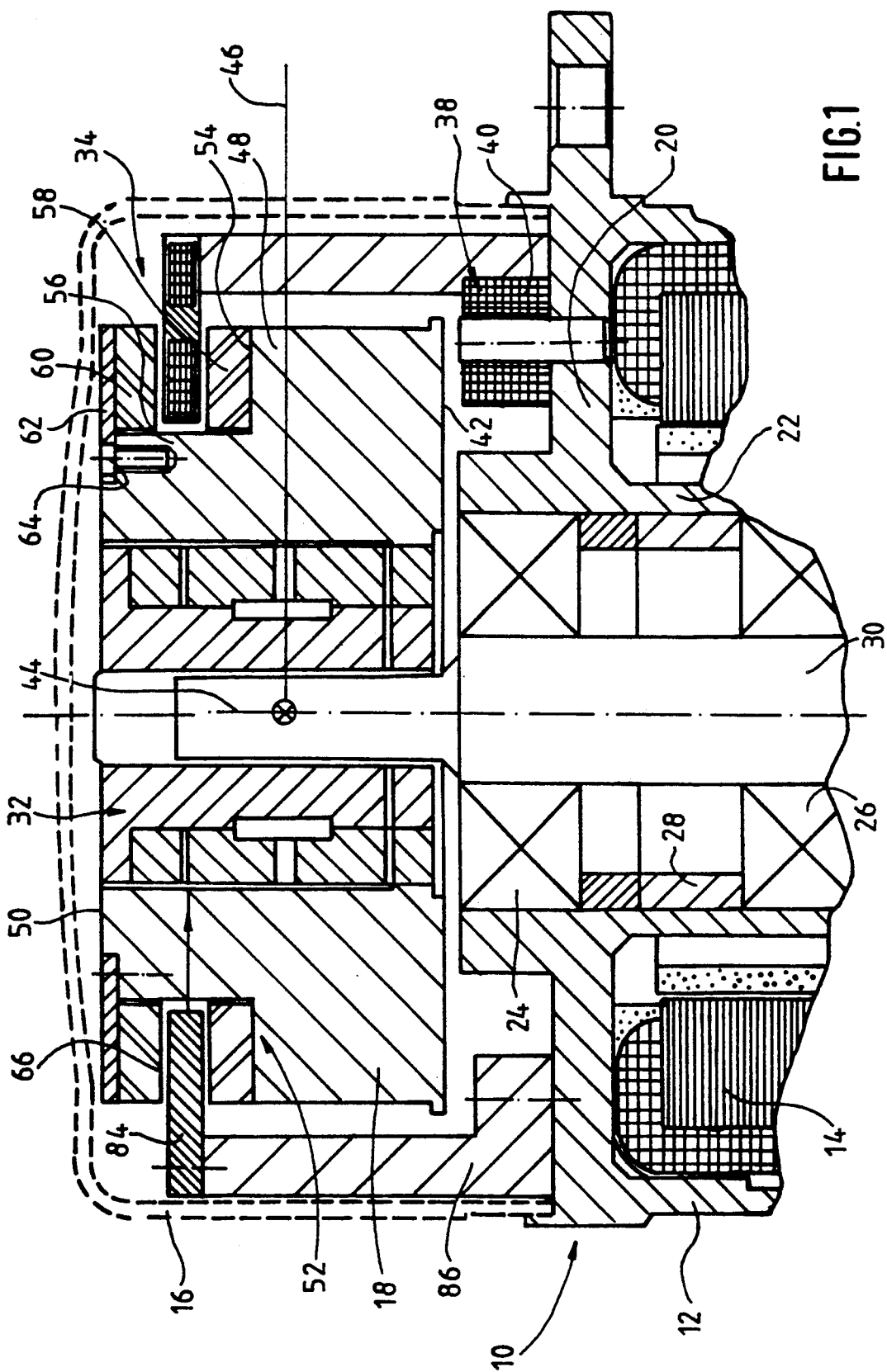
FIG. 1 shows a broken-off, longitudinal sectional view of the part of a case which contains the gyro rotor with the pick-offs and the torquers of an electrically caged, dynamically tuned gyro.
Figure 2:
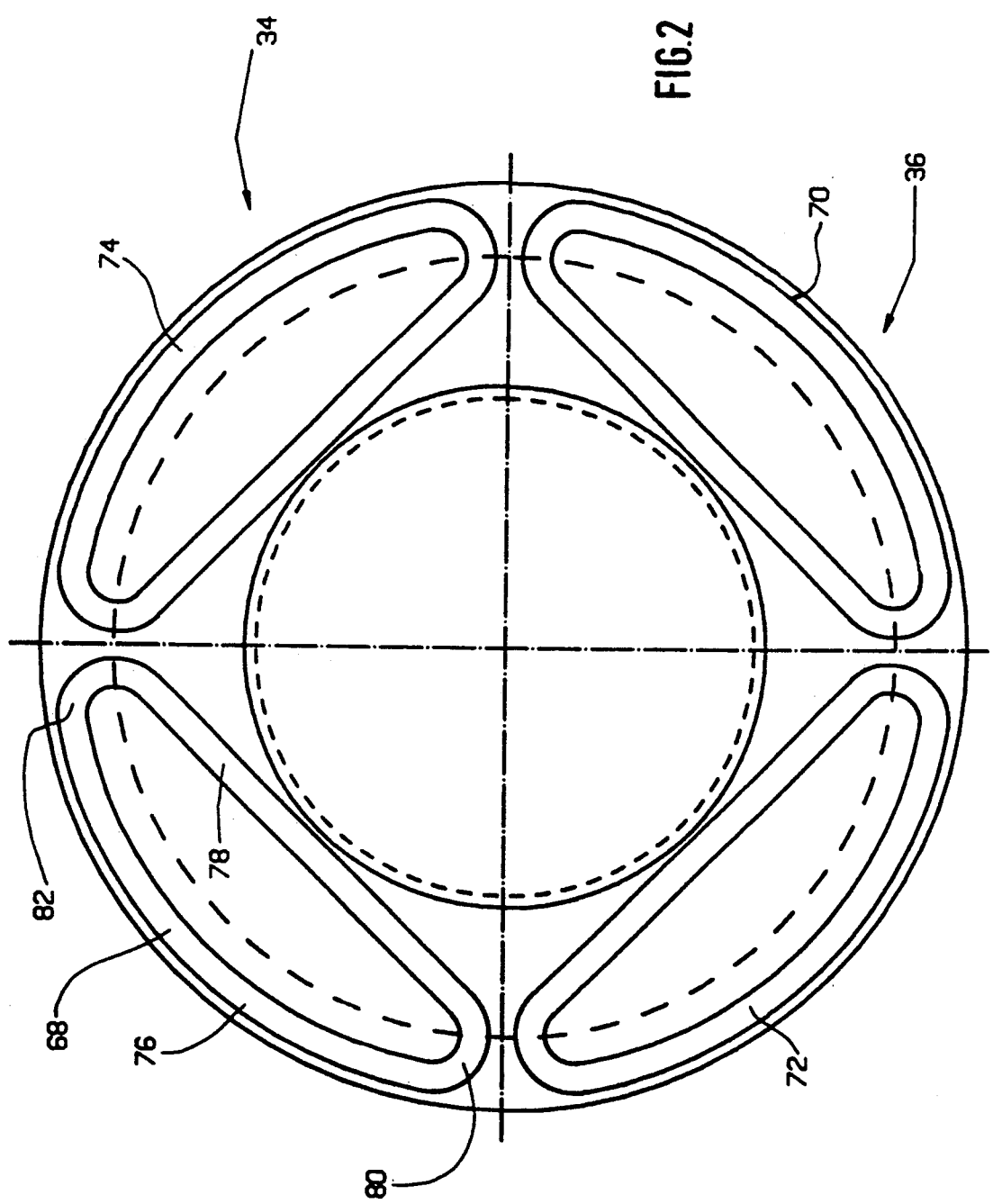
FIG. 2 shows a cross-section of the annular disc containing the flat coils of the torquers, the magnetized annular discs of the torquers being also shown in dashed lines.

A gyro case 10 contains a first case part 12 holding a motor 14, and a second case part 16 enclosing a gyro rotor 18. A partition 20 stretches between the two case parts 12 and 16. The partition 20 forms a central socket 22, in which ball bearings 24 and 26 sit. A motor shaft 30 of the motor 14 is arranged in the ball bearings 24 and 26. The motor shaft 30 extends into the second case part and is connected with the gyro rotor 18 by means of a gimbal assembly. The gimbal assembly can be constructed according to one of the previously cited references, e.g. DE-C2-32 13 720, and is not, therefore, herein described in detail.

The gyro contains torquers 34, 36 and pick-offs, of which only one is visible in FIG. 1 and is designated by 38.

The pick-offs 38 contain diametrically opposed induction coils 40, which are arranged on the partition 20 closely in front of an end face 42 of the gyro rotor. One of these coils 40 can be seen in FIG. 1. A second coil of the same pick-off 38 is arranged diametrically opposite. During an excursion of the gyro rotor about a first input axis 44 which is perpendicular to the paper plane of FIG. 1, the end face 42 of the gyro rotor 18 approaches one of these induction coils as it moves away from the diametrically opposed induction coil. In this way, the inductivities of the induction coils is changed in opposite directions. The induction coils are connected in a signal circuit, which supplies a corresponding pick-off signal. Such signal circuits are generally known and are not, therefore, herein described in detail. A second corresponding pick-off having two diametrically opposed induction coils is arranged in a plane at a right angle to the paper plane of FIG. 1 and responds to the excursion of the gyro rotor 18, about a second input axis 46 lying on the paper plane of FIG. 1.

The gyro rotor 18 contains a turned part 48. The turned part 48 forms a step 52 on the end face 50 which is remote from the motor 14 and the end face 42. The step forms a ring shoulder 54 and a peripheral surface 56 communicating therewith. An annular disc 58, consisting of an axially magnetized material, is guided on the peripheral surface 56 and lies on the ring shoulder 54. The annular disc 58 is connected to the ring shoulder 54 by suitable means such as adhesive. A second annular disc 60 similar to the annular disc 58 likewise consists of axially magnetized material. The magnetized annular disc 60 is connected to an annular disc 62. The annular disc 62 lies on the end face 50 of the gyro rotor 18 and is connected thereto by means of screws 64. The annular disc 62 extends over the step 52. The magnetized annular disc 60 is likewise guided on the peripheral surface 56. An air gap 66 exists between the two annular discs 58 and 60. The annular disc 62 lies in an annulat recess of the end face 50 such that the top side of the annular disc 62 is aligned with the middle section of the end face 50.

These magnetized annular discs form parts of the torquers.

The torquers 34 and 36 furthermore contain two pairs of diametrically opposed flat coils 68, 70 and 72, 74. Each winding of the flat coils 68 through 74 contains a curved outer section 76 extending over approximately a quadrant, and a secantial inner section 78. These two sections are connected by means of sections 80, 82 of smaller radius of curvature. The flat coils are cast into an annular disc 84 consisting of synthetic material. With its inner edge, this annular disc 84 extends into the air gap 66 between the magnetized annular discs 58 and 60. The outer edge of the annular disc 84 and, with it, the outer sections of the flat coils 68, 70 and 72, 74 lie outside of the air gap 66. The annular disc 84 and the magnetized annular discs 58 and 60 are axially spaced from the center of the gimbal assembly, which center coincides with the intersection point of the input axes 44 and 46.

The annular disc 84 having the flat coils 68 through 74 sits on a cylinder jacket 86 which surrounds the gyro rotor 86. The cylinder jacket is connected to the partition 20 radially outside of the pick-offs.

The described arrangement operates as follows:

When both the diametrically opposed flat coils, e.g. 68 and 70, of a torquer 34 are energized in push-pull according to a method which is known and is, therefore, herein not described in detail, then the one flat coil is drawn into the air gap 66 between the magnetized annular discs and the magnetic field formed therein, while the other flat coil is urged out of this air gap. Because the annular disc 84 containing the flat coils 68 and 70 is fixed to the housing, a reaction torque is exerted on the gyro rotor.

The flat coils are at a maximal axial distance from the induction coils of the pick-offs. Because of this, the direct magnetic interference between the pick-offs and the flat coils is small.

I claim:

1. A dynamically tuned gyro, comprising:

a gyro case having a first case part and a second case part, said first case part forming an annular partition and a central socket supported by said partition, ball bearings in said socket, a motor having a motor shaft, said motor being located in said first case part said shaft being rotatably mounted about a shaft axis in said socket through said ball bearings, a gyro rotor, having an end face facing said partition, said gyro rotor, near its end remote from said partition carrying a pair of axially magnetized annular discs extending radially along its periphery and defining an air gap therebetween, a gimbal assembly constructed by means of spring joints for connecting the gyro rotor with said motor shaft, said spring joints exerting restoring torques on said gyro rotor, when said gyro rotor is deflected from a central position, said gimbal assembly comprising a gimbal the dynamic torques of which compensate for the restoring torques of the spring joints, whereby said gyro rotor is driven by said motor through said shaft and said gimbal assembly but is universally movable substantially without restoring force about said gimbal assembly, a first pair of pick-off coils attached to said partition at diametrically opposite locations and cooperating with said end face to provide signals indicative of excursion of said gyro rotor about a first input axis orthogonal to said shaft axis, a second pair of pick-off coils attached to said partition at diametrically opposite locations angularly offset by 90° from said first pair of pick-off coils about said shaft axis, and cooperating with said end face to provide signals indicative of excursion of said gyro rotor about a second input axis orthogonal to said shaft axis and said first input axis, a cylinder jacket separate from said gyro case, said jacket surrounding said gyro rotor radially outside of said pick-off coils and being attached to said partition, said gyro rotor, near its end remote from said partition carrying a pair of axially magnetized annular discs extending radially along its periphery and defining an air gap therebetween, pairs of opposite flat coils extending radially and angularly spaced by 90°; said coils being held in a rigid stator annular disc, said stator annular disc being supported on the end face remote from said partition and extending into said air gap between said axially magnetized annular discs, each of said pairs of opposite flat coils being arranged cooperate with said axially magnetized annular discs to exert a torque on said gyro rotor, when current is passed through said opposite flat coils, whereby first and second torquers angularly spaced by 90° are formed by said flat coils and said axially magnetized annular discs, said stator annular disc being angularly oriented on said end face of said cylinder jacket such that said first torquer is arranged to exert a torque on said gyro rotor about said first input axis and said second torquer is arranged to exert a torque on said gyro rotor about said second input axis, said second case part being cup shaped and placed, with its rim, on said partition so as to cover said gyro rotor, said stator annular disc and said cylinder jacket.

2. Dynamically tuned gyro as claimed in claim 1, characterized in that the flat coils (68, 70; 72, 74) of the torquers (34, 36) are cast into an annular disc (84).

3. Dynamically tuned gyro as claimed in claim 2, characterized in that the annular disc (84) is provided at a cylinder jacket (86) surrounding the gyro rotor (18). which cylinder jacket is connected to a partition (20) of the gyro case (10).

4. Dynamically tuned gyro as claimed in claim 1 characterized in that the flat coils (68, 70; 72, 74) of the torquers (34, 36) are arranged in the area of one end of the gyro rotor (18), and the pick-offs (38) are arranged axially spaced therefrom in the area of the other end of the gyro rotor (18).

5. Dynamically tuned gyro as claimed in claim 4, characterized in that the flat coils (68, 70; 72, 74) are arranged close to the end of the gyro rotor (18) which end is remote from the motor (14).

6. Dynamically tuned gyro as claimed in claim 5, characterized in that (a) the gyro rotor (18) contains a turned part (48) forming a step (52) along the periphery of its end which is remote from the motor (14), (b) a first of said axially magnetized annular discs is situated on the ring shoulder (54) which is formed by this step, and (c) a second of said axially magnetized annular discs is fixed at a carrier disc (62) which is fastened to the end face (50) of the turned part (48) and extends over the step (52), the second magnetized annular disc (60) being guided on the peripheral surface (56) of the step (52) and the air gap (66) of the torquers (34, 36) is formed between the annular discs (58, 60).

7. Dynamically tuned gyro as claimed in claim 1 characterized in that each torquer (34, 36) contains a pair of diametrically opposed flat coils.

8. Dynamically tuned gyro as claimed in claim 7, characterized in that each winding of the flat coils (68, 70; 72, 74) contains a curved outer section (76) substantially extending over a quadrant, and a secantial inner section (78).

9. Dynamically tuned gyro as claimed in claim 2 characterized in that the outside diameter of the magnetized annular discs (58, 60) lies approximately in the middle between the inside diameter and the outside diameter of the annular disc (84) containing the flat coils (68, 70; 72, 74).

* * * * *